(12) United States Patent
Möller

(10) Patent No.: US 6,187,396 B1
(45) Date of Patent: Feb. 13, 2001

(54) BAG FOR WRAPPING FOOD ITEMS

(76) Inventor: Karl-Heinz Möller, Rosmarinweg 5, 65191 Wiesbaden (DE)

( * ) Notice: Under 35 U.S.C. 154(b), the term of this patent shall be extended for 0 days.

(21) Appl. No.: 09/132,478

(22) Filed: Aug. 11, 1998

(30) Foreign Application Priority Data

Mar. 14, 1998 (DE) .......................................... 298 04 638 U

(51) Int. Cl.$^7$ .......................... B65D 33/04; B65D 30/08; B65D 30/10
(52) U.S. Cl. ........................ 428/34.3; 428/35.6; 428/137; 428/339; 428/507; 428/513; 383/102; 383/106; 383/107; 383/113; 383/116; 383/123
(58) Field of Search ................................ 428/34.2, 34.3, 428/35.6, 336, 337, 137, 138, 507, 513, 339; 383/102, 103, 106, 113, 123, 116, 107; 426/106, 118

(56) References Cited

U.S. PATENT DOCUMENTS

| | | | |
|---|---|---|---|
| 3,628,720 | * 12/1971 | Schmedding | 383/103 |
| 3,650,775 | * 3/1972 | Simon et al. | 426/129 |
| 4,579,223 | * 4/1986 | Otsuka et al. | 206/204 |
| 4,861,957 | 8/1989 | Welles | 219/730 |
| 4,937,113 | * 6/1990 | Engelsberger | 428/35.3 |
| 4,943,440 | * 7/1990 | Armstrong | 426/118 |
| 5,288,531 | * 2/1994 | Falla et al. | 428/35.2 |
| 5,346,312 | * 9/1994 | Mabry et al. | 383/113 |
| 5,399,022 | * 3/1995 | Sheets | 383/103 |
| 5,405,663 | * 4/1995 | Archibald et al. | 428/34.3 |
| 5,492,705 | 2/1996 | Porchia et al. | 426/106 |
| 5,560,945 | * 10/1996 | Geddes et al. | 426/127 |
| 5,565,230 | * 10/1996 | Bailey | 426/311 |
| 5,591,504 | * 1/1997 | Lieberman | 428/68 |
| 5,811,161 | * 9/1998 | Joves et al. | 428/34.3 |

FOREIGN PATENT DOCUMENTS

| | | |
|---|---|---|
| 72050/91 | 9/1991 | (AU) . |
| 659 046 | 12/1986 | (CH) . |
| 1 985 257 | 5/1968 | (DE) . |
| 25 01 022 | 7/1975 | (DE) . |
| 41 29 426 | 3/1993 | (DE) . |
| 295 12 736 U | 11/1995 | (DE) . |
| 02691434 | * 11/1993 | (FR) . |
| 1 472 004 | 4/1977 | (GB) . |
| 93/22207 | 11/1993 | (WO) . |

\* cited by examiner

*Primary Examiner*—Rena L. Dye
(74) *Attorney, Agent, or Firm*—Wenderoth, Lind & Ponack, L.L.P.

(57) ABSTRACT

A bag for wrapping food items is formed of a composite material including at least one first layer of cellulose-containing material having a specific weight of from 15 to 40 g/m$^2$ and a second layer having a thickness of from 6 to 20 μm. The composite material has perforations therein. A ratio of the total area occupied by the perforations to a total surface area of the composite material is from 1/150 to 1/250. The second layer may be formed of polyethylene and may be temperature resistant to an elevated temperature. The composite material may be formed of at least one sheet having edges joined along a seam. The bag may have a window therein formed of transparent or translucent material.

21 Claims, 1 Drawing Sheet

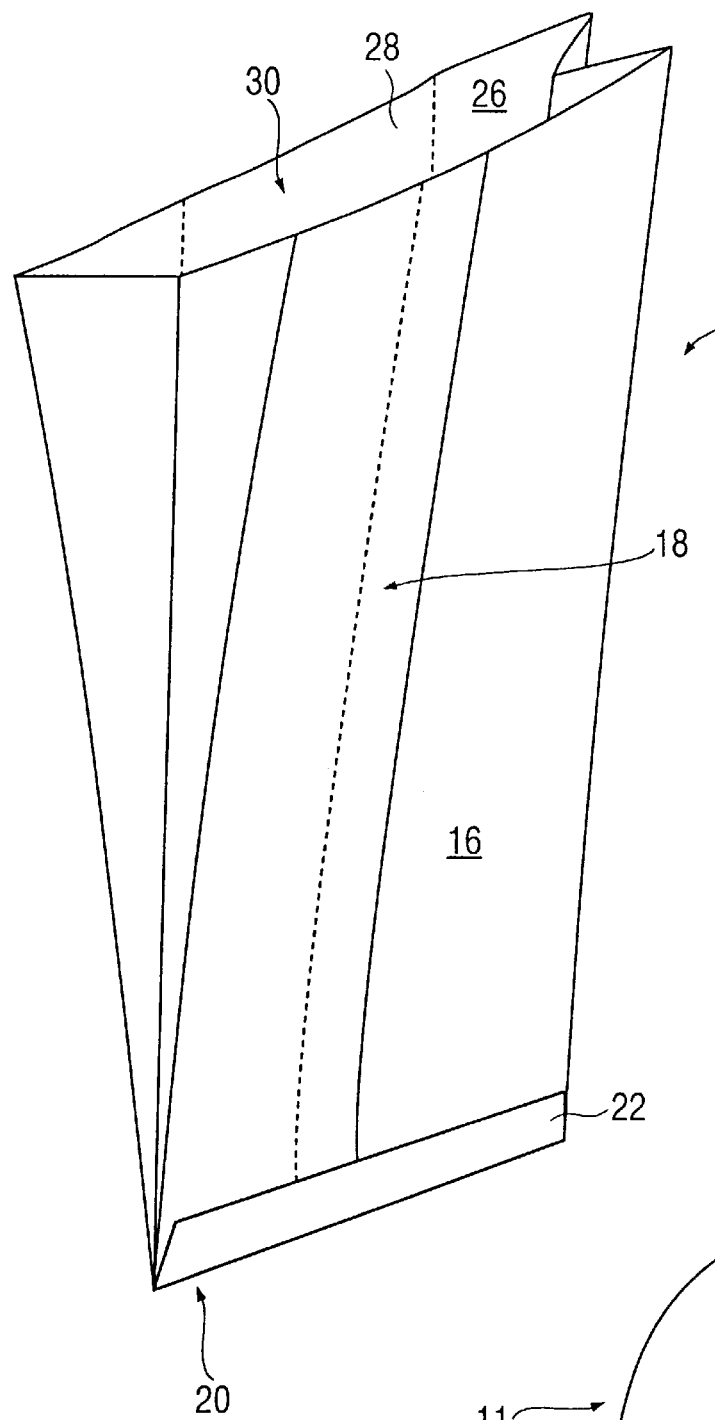
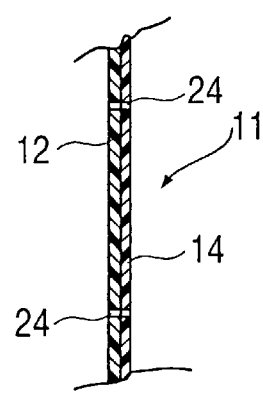
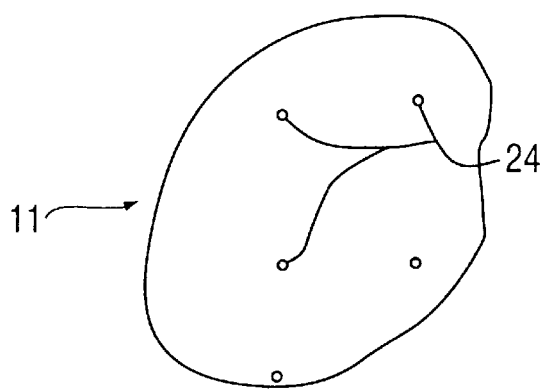

BAG FOR WRAPPING FOOD ITEMS

BACKGROUND OF THE INVENTION

The present invention relates to a bag for wrapping food items, in particular bread and similar baked goods.

Food item packagings basically have the task of protecting the product against drying-out and loss of aroma as well as against damaging external influences. In addition, they must be safe from a health point of view. With respect to the shelf life and freshness of baked goods, such as bread, it is critical, on the one hand, that the baked goods do not dry out and, on the other hand, that for example the crust of the bread, nevertheless, remains crunchy.

Fresh bread and similar baked goods are commonly wrapped by bakeries into sheets of paper or bags of paper, of synthetic material or of a composite material thereof. In conventionally used packaging materials it has not been possible until now to maintain the freshness of a loaf of bread for more than two days. For example, when using wrappings of paper the cut edge of the cut bread is already dry and hard after only two days. In the case of synthetic wrappings, the moistness of the bread is maintained, however the crust absorbs the moisture and thereby becomes soft and rubbery. If it is assumed that a loaf of bread is consumed within four days, the second half of the loaf, consequently, is regularly stale.

A further requirement made of packaging for baked goods, such as bread, in particular when used in bakeries, is ease of handling. It should be possible to package the baked goods rapidly without great expenditures so that the customer can be served as rapidly as possible. The requirement may also exist of having to package the baked goods, in particular bread, still warm immediately after removal from an oven. Conventionally used packaging materials, in particular including synthetic material, are not suitable for this purpose since the bread quickly becomes moldy if it is wrapped while still warm.

DE 295 12 436 U 1 relates to a packaging produced of multi-layer composite material in the form of a bag, a box or the like, in particular for packaging fat-containing goods. The multi-layer composite material comprises a layer facing the inner volume of the packaging comprising an absorbent paper and a layer of a water-proof synthetic film. The paper can be filter paper and the synthetic film can be polyethylene. Herewith a packaging is being suggested which is suitable for storing fat-containing goods even over a relatively long time.

DE-GM 19 85 257 discloses a sack, bag or the like with a wall comprising several layers of which the outer layer comprises synthetic film and at least one inner layer comprises paper, and the synthetic layer disposed on the outside, before the sack is formed, is connected by means of adhesive with the paper layer adjoining it on the inside to form a wall unit. Hereby a sack, bag or the like is to be suggested which, for one, can be manufactured on conventional paper processing or bag or sack machines and, for another, comprises improved insulation of the bag contents against temperature fluctuations with simultaneously increased resistance when filled with warm goods.

CH 659 056 A5 discloses a packing bag, in particular for bread-like baked goods, with two walls extending from its opening to its bottom and opposing one another, with one connected to the other to form the bag. At least one wall is composed of three webs disposed one next to the other and extending from the bag opening to the bottom and connected one with the other. The two lateral webs are formed of paper permeable to water vapor and at most translucent while the center web comprises a transparent synthetic film with the synthetic film web having a perforation. The synthetic film web can preferably be a clear polypropylene film. Hereby a packing bag, economic in production and application, is to be created which can equally well meet the needs of the customer (check of goods visually and by touch while maintaining hygienic requirements), as well as also the needs of the producer and seller (sufficient ability to breath and sales appeal).

WO 73/22207 discloses a packing bag of a perforated synthetic film for receiving food items such as vegetables and fruit, which causes local condensation in the bag such that weight losses are reduced to a minimum.

SUMMARY OF THE INVENTION

It is the object of the present invention to create a food packaging with ease of handling, which ensures a sufficiently long shelf life and freshness of the food items, in particular of baked goods, such as bread.

This object is achieved by the provision of a bag, in particular for being filled with food items, comprising a composite material with at least one first layer comprising a cellulose containing material and a second layer comprising a synthetic material, with the first layer having a specific weight of 15 to 40 $g/m^2$ and the second layer having a thickness of 4 to 20 $\mu m$, with the composite material being perforated and with the ratio of open to closed area of the composite material being between 1/50 and 1/250.

Apart from the ease of handling, a special advantage of this bag according to the invention is that it is actively breathing due to the perforation of the composite material. A controlled exchange of moisture between the inside of the bag and the surrounding is thereby possible. On the one hand, enough moisture can penetrate from the bag so that a crust of bread can give off moisture absorbed from the inside of the bread. On the other hand, only enough moisture escapes to the outside so that a cut loaf of bread, even after four days have passed, still retains sufficient moisture to not become stale and thus is still palatable to the consumer.

By way of the ratio of open area to total area of the composite material, i.e. through the choice of perforation size and number of perforations per unit area, the moisture exchange between the interior of the bag and the surroundings or exterior can be established. For example, at a low ratio of open area to total area of the composite material the moisture transition from the interior of the bag to the exterior is low while at a high ratio the moisture transition is higher. Thereby the bag of the invention can be optimally adapted in terms of its properties and seasonally varying climate conditions, for example, to different bread types, for example, bread with hard or soft crust or relatively moist or hard bread. The bag can also be used, given a correspondingly selected ratio of open area to total area of the composite material, for packaging baked goods still warm from the oven, such as bread, or for packaging already cooled baked goods at the time they are sold.

By combining a cellulose-containing layer with a synthetic material layer, apart from controlling the moisture given off, a protection against light is effected. The cellulose-containing layer, if it is the outer layer, is more pleasant to the touch than a synthetic material layer, and it is readily imprintable. Further, the composite material is sufficiently resistant to tearing and yet, in terms of its mass, is reduced to a minimum such that the accumulated packaging waste is low if the bag is no longer to be used. These advantages of the bag according to the invention not only can be utilized for keeping fresh baked goods, such as bread, but also other food items, such as for example cold cuts, meat or fish.

The first layer of the composite material is preferably formed of paper or cellulose. The synthetic material of the second layer comprises preferably a polyethylene, wherein is especially suitable an LDPE (low-density polyethylene) with a density of 0.915–0.925 g/cm$^3$ or an LLDPE (linear low-density polyethylene) with a density of 0.92–0.935 g/cm$^3$. When making the selection, ultimate tensile strength and heat resistance are of importance. For example, the synthetic material layer, in particular in the case of bags for bread or the like still warm from the oven and to be packaged, should be temperature resistant up to at least 120° C. so that bread or similar baked goods can be packaged as soon as possible after they are removed from the oven.

In a special implementation, the first and second layer are detachably connected with one another so that the composite material, to the largest possible extent, can be taken apart into its components. This results in particular in advantages during recycling. The layers of the composite material, however, can also be fixedly connected one with the other, for example in such form that the synthetic material layer is vapor-deposited onto the cellulose-containing layer preferably. The second layer forms the inside of the bag.

The bag can comprise at least one seam along its longitudinal orientation. The seam can be formed by sealing, welding or adhering of the first and/or second layer. For example, by welding or sealing of the adjoining synthetic material layers at the site of the seam also the superjacent first layer comprising the cellulose-containing material is connected with the second layer. Thus, even with otherwise detachable layers the strength and stability of the bag is ensured. The composite material superjacent at the bottom side of the bag is preferably turned over in a double fold. The first layers, due to the folding, lying one on top of the other, of the composite material can subsequently be adhered one with the other such that here also a strong connection is possible in an otherwise detachable composite material.

The perforation of the composite material is formed of holes having a mean diameter of 0.3 mm to 1.5 mm, preferably 1 mm. At this hole size an effective protection of the food item against the influence of light and dirt is ensured while simultaneously permitting moisture exchange.

It is also possible to integrate into at least one of the walls of the bag a window of transparent or translucent material, potentially of composite material of the above described type, such that the bag contents is visible.

BRIEF DESCRIPTION OF THE DRAWINGS

An embodiment of the invention will be described in more detail below, with reference to the accompanying drawings, wherein:

FIG. 1 is a perspective view of an embodiment of a bag in accordance with the present invention;

FIG. 2 is an enlarged cross section through a composite material employed to form the bag; and FIG. 3 is an enlarged view of a portion of the composite material indicating perforations therein.

DETAILED DESCRIPTION OF THE INVENTION

In the illustrated embodiment, a bag 10 seen from the back side comprises a composite material 11 including an outer, readily imprintable layer 12 of cellulose with a density of approximately 20 g/m$^2$, and an inner layer 14 of LDPE having a thickness of 8 $\mu$m, which hinders the penetration of moisture, fat and the like. In the production of such a composite material 11 the LDPE layer 14 is, for example, applied directly from a blown film extruder onto the cellulose layer 12 and, by pressing the extruded LDPE layer in spots onto the cellulose layer, is fastened during coating.

The bag T comprises a multiply folded rectangular sheet of the composite material 11, which is folded several times in the longitudinal direction such that the LDPE layer 14 forms the inner layer of the bag. For example, as shown in FIG. 1, sides of bag 10 may be gussetted. The inside LDPE layer 14 is heat-sealed on the adjoining free ends of the sheet in the longitudinal direction such that a rear wall 16 of the bag has a seam 18 extending in the longitudinal direction. Due to the sealing, the cellulose layer 12 in the region of seam 18 is fixedly connected with the subjacent LDPE layer. But affixing by adhesion is also possible. The superimposed composite material of bag 10 is turned over at the bottom side 20 with a double fold 22. The outer sides of the composite material due to the folding, lie one on top of the other, and are affixed, for example, by adhesion.

The bag 10 has, for example, regular perforations 24 formed by holes disposed in various parallel rows with a diameter of approximately 1 mm and a distance of approximately 15 mm with the rows having a spacing from each other of approximately 15 mm. The ratio of open area to total area of the composite material is from 1/150 to 1/250. Thus:

$$n*\pi*(D/2)^2/A$$

(N=number of holes; d=average diameter of holes; A=Total $$2*\pi*(1 \text{ mm}/2^2/(15 \text{ mm})^2=\pi/450=1/150.$$

The perforations are, for example, introduced with a needle roller either into the composite material before it is processed into a bag, or into the bag produced of the composite material.

A front wall 26 of bag 10 has integrated therein a window 28 of a transparent or translucent material which extends continuously, for example, from an opening 30 of bag 10 to the bottom side 20, which facilitates production.

Although the present invention has been described and illustrated with respect to a preferred embodiment thereof, it is to be understood that various changes and modifications may be made to the specifically described and illustrated features without departing from the scope of the present invention. Particularly, it is contemplated that the bag may have a somewhat different configuration than the specifically illustrated gussetted configuration shown in FIG. 1. Accordingly, it is contemplated that all such modifications are contemplated as being within the scope of the appended claims unless specifically excluded therefrom.

What is claimed is:

1. A bag for wrapping food items, said bag comprising:
   a composite material including at least one first layer of paper or cellulose having a specific weight of from 15 to 40 g/m$^2$ and a second layer having a thickness of from 4 to 20 $\mu$m; and
   said composite material having perforations, wherein a ratio of an area occupied by said perforations to a total area of said composite material is from 1/150 to 1/250.

2. A bag as claimed in claim 1, wherein said second layer is formed of polyethylene.

3. A bag as claimed in claim 2, wherein said polyethylene comprises LDPE.

4. A bag as claimed in claim 3, wherein said LDPE has a density of from 0.915 to 0.925 g/cm$^3$.

5. A bag as claimed in claim 2, wherein said polyethylene comprises LLDPE.

6. A bag as claimed in claim 5, wherein said LLDPE has a density of from 0.92 to 0.935 g/cm$^3$.

7. A bag as claimed in claim 1, wherein said second layer is temperature resistant to a temperature of at least 120° C.

8. A bag as claimed in claim 1, wherein said first and second layers are detachably connected to each other.

9. A bag as claimed in claim 1, wherein said second layer defines an inside of said bag.

10. A bag as claimed in claim 1, wherein said composite material comprises at least one sheet having edges joined along a seam extending longitudinally of said bag.

11. A bag as claimed in claim 10, wherein said seam is formed by joining at least one of said first and second layers of said edges.

12. A bag as claimed in claim 11, wherein said joining comprises one of sealing, welding and adhering.

13. A bag as claimed in claim 9, wherein said edges are joined by one of sealing, welding and adhering.

14. A bag as claimed in claim 1, comprising a bag bottom formed by folding over super-adjacent portions of said composite material to form a double fold.

15. A bag as claimed in claim 14, wherein due to said folding said layers are superimposed, and the thus superimposed layers are fixed together by adhesion.

16. A bag as claimed in claim 1, wherein said perforations comprise holes having an average diameter of from 0.3 to 1.5 mm.

17. A bag as claimed in claim 16, wherein said average diameter comprises 1 mm.

18. A bag as claimed in claim 1, further comprising a window.

19. A bag as claimed in claim 18, wherein said window is provided in a wall of said bag.

20. A bag as claimed in claim 18, wherein said window is formed of transparent material.

21. A bag as claimed in claim 18, wherein said window is formed of translucent material.

* * * * *

UNITED STATES PATENT AND TRADEMARK OFFICE
CERTIFICATE OF CORRECTION

PATENT NO. : 6,187,396 B1
DATED : February 13, 2001
INVENTOR(S) : Karl-Heinz Möller It is certified that error appears in the above-identified patent and that said Letters Patent is hereby corrected as shown below:

<u>Title page,</u>
Item [57], ABSTRACT,
Line 7, change "1/150" to -- 1/50 --;

<u>Column 4,</u>
Line 29, change "1/150" to -- 1/50 --.

Signed and Sealed this

Second Day of November, 2004

JON W. DUDAS
*Director of the United States Patent and Trademark Office*